(12) United States Patent
Udelhoven

(10) Patent No.: US 6,711,847 B1
(45) Date of Patent: Mar. 30, 2004

(54) PROTECTIVE SHELL FOR A BARBED FISHING LURE

(76) Inventor: Gerald Wilson Udelhoven, 10513 Cty Hwy. S., Blue River, WI (US) 53518

( * ) Notice: Subject to any disclaimer, the term of this patent is extended or adjusted under 35 U.S.C. 154(b) by 0 days.

(21) Appl. No.: 10/260,245

(22) Filed: Sep. 30, 2002

(51) Int. Cl.[7] .............................................. A01K 97/06
(52) U.S. Cl. ...................................................... 43/25.2
(58) Field of Search ................................ 43/25.2, 57.1, 43/25

(56) References Cited

U.S. PATENT DOCUMENTS

| | | | |
|---|---|---|---|
| 402,270 A | 4/1889 | Mumford | |
| 911,117 A | 2/1909 | Crosier | |
| 1,216,069 A | 2/1917 | Cammack | |
| 2,285,888 A | * 6/1942 | Benton | 43/25.2 |
| 2,584,430 A | 2/1952 | Dayton et al. | |
| 2,627,133 A | 2/1953 | Pletcher | |
| 2,699,623 A | 1/1955 | Pragalz | |
| 2,767,133 A | 10/1956 | Reynolds | |
| 2,767,502 A | * 10/1956 | Reynolds | 43/25.2 |
| 2,825,992 A | 3/1958 | Miller | |
| 2,885,817 A | 5/1959 | Carter | |
| 3,199,243 A | * 8/1965 | Caston | 43/25.2 |
| 3,453,770 A | * 7/1969 | Schultz | 43/57.1 |
| 3,484,980 A | 12/1969 | Wait | |
| D217,663 S | 5/1970 | Chamberlain | |
| 3,769,741 A | * 11/1973 | Hessler et al. | 43/57.1 |
| 4,015,361 A | * 4/1977 | O'Reilly et al. | 43/25.2 |
| 4,216,604 A | * 8/1980 | Starke | 43/25.2 |
| 4,418,490 A | 12/1983 | Ancona | |
| 4,441,274 A | * 4/1984 | Masur | 43/25.2 |
| 4,452,003 A | 6/1984 | Deutsch | |
| 4,920,683 A | * 5/1990 | Weber | 43/25.2 |
| 4,936,040 A | 6/1990 | Reiter et al. | |
| 5,233,783 A | 8/1993 | Roebuck et al. | |
| 5,235,775 A | * 8/1993 | Daughtry | 43/25.2 |
| 5,297,676 A | 3/1994 | Coleman | |
| 5,430,969 A | 7/1995 | Taylor et al. | |
| 5,446,990 A | * 9/1995 | Eriksson | 43/25.2 |
| 5,475,942 A | * 12/1995 | Tatum | 43/25.2 |
| 5,502,916 A | * 4/1996 | Krewson, Jr. | 43/25.2 |
| 5,515,640 A | * 5/1996 | Cosby et al. | 43/25.2 |
| 5,588,245 A | * 12/1996 | Vance | 43/25.2 |
| 5,992,082 A | 11/1999 | Barefoot | |
| 6,023,876 A | * 2/2000 | Haddad et al. | 43/25.2 |
| 6,082,041 A | 7/2000 | Croop et al. | |
| 6,085,455 A | * 7/2000 | Bracken et al. | 43/25.2 |
| 6,418,658 B1 | * 7/2002 | Knickrehm | 43/25 |

FOREIGN PATENT DOCUMENTS

| | | | |
|---|---|---|---|
| DE | 29700294 B1 | * | 7/1997 |
| EP | 1281318 B1 | * | 2/2003 |
| FR | 2587880 B1 | * | 4/1987 |
| FR | 2702928 B1 | * | 9/1994 |
| JP | 9-23798 B1 | * | 1/1997 |
| JP | 9-47202 B1 | * | 2/1997 |
| JP | 9-182550 B1 | * | 7/1997 |
| JP | 10-150896 B1 | * | 6/1998 |
| JP | 2001-204338 B1 | * | 7/2001 |
| JP | 2002-171885 B1 | * | 6/2002 |

* cited by examiner

*Primary Examiner*—Darren W. Ark
(74) *Attorney, Agent, or Firm*—Loyd W. Bonneville, Attorney

(57) ABSTRACT

A hinged flexible plastic shell in which barbed fishing lures and fish-hooks in general may be kept to avoid injury connects to a fishing rod merely by an operator's closing of its lid upon the rod by pop-open and pop-shut manipulation of certain nodes atop the shell's lid. To close, he or she depresses a pop-shut node against an enclosure ridge on the underlying storage portion. To open, either of the pop-open nodes may be depressed against notch shoulders to cause the lid to flex outward to position it for co-engagement with the lower portion.

7 Claims, 4 Drawing Sheets

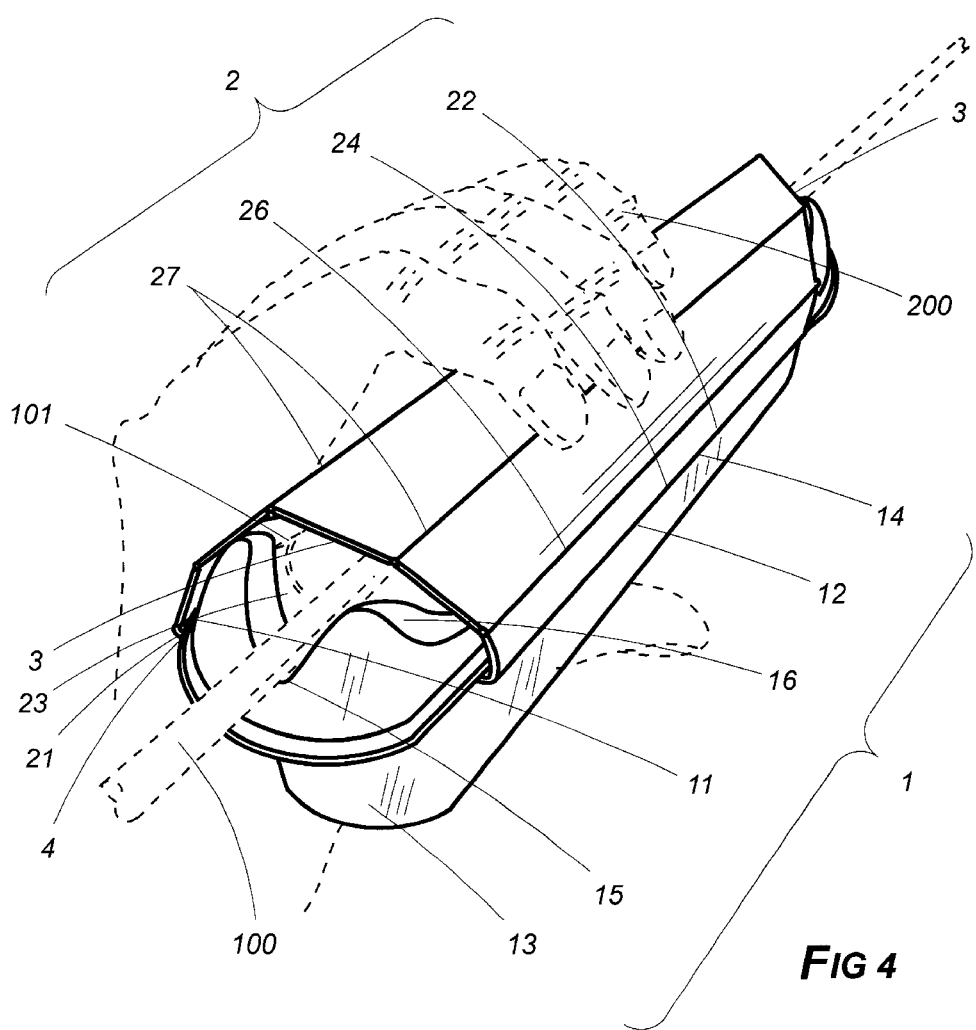

PROTECTIVE SHELL FOR A BARBED FISHING LURE

BACKGROUND OF THE INVENTION

1. Field of the Invention

Fishing gear

2. Description of the Prior Art

Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term first compression node (26) might be used in one instance but in another, if meaning is otherwise clear from context, expression might be shortened to first node (26) or merely node (26). Any of those forms is intended to convey the same meaning.

The term attach or fasten or any of their forms when so used means that the juncture is of a more or less permanent nature, such as might be accomplished by nails, screws, welds or adhesives. Thus it could be stated herein that the connection of hooks to a barbed fishing lure (101) is one of attachment in that the hooks are embedded within the lure's (101) structure in manufacture. A connection in which one object is easily removed from another is described by the word emplace, as where it is stated herein that a barbed fishing lure or fish-hook (101) might be emplaced within— merely set into—the shell to avert injury to the operator (200). A connection in which two objects, although not attached, could be separated only with considerable difficulty is referred to herein as one of rigid emplacement The spring clamp fastening of any of several prior art barbed lure protectors (101) to a fishing rod (100) is stated herein to be such a connection. Employment of the words connector join or any of their forms is intended to include the meaning of any of those terms in a more general way. The meaning in the respective cases is clear from context, however. Accordingly, modifying words to clarify which of the two uses is the intended one seem unnecessary.

The word comprise may be construed in any one of three ways herein. A term used to describe a given object is said to comprise it, thereby characterizing it with what could be considered two-way equivalency in meaning for the term. Thus, it is stated that FIG. 2 comprises a perspective view of a closed shell, meaning merely that the drawing is in fact that view. The term comprise may also be characterized by what might be considered one-way equivalency, as when it is stated herein that the integrally molded seam between the lid's first edge (21) and the body's first ridge (11) by infusion or extrusion shown in all of the drawings herein comprises the hinged attachment, meaning that in all those instances, that joint is itself the attachment This use of the word has a generic sense to it. That is, the integrally molded connection (4) will always be an attachment but a hinged attachment between the lid (2) and the body (1) may be a molded together structure in one case but something else in another. However, the word comprise may also be used to describe a feature which is part of the structure or composition of a given object. Thus, the enclamping lid (2) is stated to comprise, among other things, an enclamping lip (24) as a component thereof. The meaning in the respective cases is clear from context, however. Accordingly, modifying words to clarify which of the three uses is the intended one seem unnecessary.

Terms relating to physical orientation such as top or bottom, upper or lower, refer to the positioning of the object in the manner it would be observed if the operator (200) is holding it for opening and closing manipulations with the enclampment lid (2) directed upward. This convention has been adopted as a matter of convenience in discussing orientation and as shown in the drawings, the semi-tubular body (1) is considered to underlie the lid (2) and comprise notch shoulders (16) directed upward toward the lid (2) which is impressed downward against them upon depressing the compression nodes (26, 27) which are disposed upon the lid's exterior or topside. The use of the terms in this manner must, of course, be interpreted so as to be equally understood regardless of what attitude the object is positioned—such as, for example, if it were tipped upside down by inversion of an operator's (200) wrist. Similarly, the terms inwardly or outwardly—or exterior, as mentioned just supra— necessarily have the central part of the shell as their reference point.

The term longitudinal or derivations therefrom refer to generally elongated configuration of an object comprising greater length than width. Thus, most of the structural components are stated to comprise what is described herein as longitudinal extension.

Although difficulties often arise when flexibility is spoken of, some objectivity is appropriate in the term's usage. Herein, the characteristic of flexibility does not require the looseness or springability of a rubber band. The materials to be addressed should be bendable and slightly twistable without one's having undue concern for damage. The notion of semi-flexiblility should be included as part of its definition. The material utilized should permit the momentary manual deformation referred to ante, and although the pop-open, pop-shut closure capabilities spoken of herein do not themselves address plastic memory as such, the formed product should have sufficient of that quality to maintain structural integrity of shape.

The terms semi-tubular or semi-tubularly configured bear considerable significance herein. They define a longitudinal half or other fractional portion of a generally tubular structure such as a bathtub or dug-out canoe might portray, for example. The construction may have closed ends in the manner those objects do, or open ends like those one would observe at the ends of a soda straw split along its lengthwise dimension.

The word pend—derived most likely from the root depend, as in dependent—is used herein to denote a hanging relationship of one object to another. It is generally considered that a pending object is disposed with a certain looseness with that from which it hangs, rather than being connected to it in any firm-fitting manner.

Certain words have been coined herein to simplify discussion. For example, co-engage is a term frequently applied to describe the special open and closure relationship between the enclamping lip (24) and the semi-tubular body's second laterally opposing ridge (12). The words enclamping and enclampment themselves are matters of convenient coinage, meaning that as adjectives, they merely help define the functional clamping character of the object addressed in the particular case. For example, references to barbed fishing lure (101) are intended as well to include fish-hooks; and those to fishing rod (100), a bamboo or any other sort of fishing pole. The meanings of many expressions are explained in context, ante.

In some cases, a noun may be converted to a verb or adjective. The expression pop-open pop-shut is a shorthand reference to manipulative features attending the objects presented herein by reason of their particular configuration, mutual disposition of parts and compositional characteristics. This term teaches that deliberate manipulation is required to effect either an opening or a closing of the object—a longitudinally divided shell in this case. It has significance herein because of flexible characteristics of the plastic material employed for the invention and, of course, the shape its components are formed into. The thickness, hardness and perhaps several other properties of the plastic also contribute to this crucial issue. The term pop-open, pop-shut, however, must be distinguished from what might be properly labeled pop-open, memory closed—a characteristic by which objects after being stressed in some manner as by stretching, for example, automatically resume their former shape and disposition. It would not be inappropriate to consider the term squeeze open to incorporate the meaning of both phenomena in a general way. As we will see, a substantial sector of prior art encompassed the pop-open, memory closed feature—reminiscent, perhaps, even of the rudimentary species of Latin American leather coin purses. Plastics have great propensity for pop-open, memory closed attributes which must not be considered akin to or confused with the pop-open, pop-shut plastic constructions addressed herein. In undertaking a pop-open, pop-shut operation, the operator (200) grasps the container or other hollow object and momentarily deforms a portion of it, causing some other portion—likely nearby—to respond. Then upon release of the deforming manipulation, the object returns to it previous configuration. This phenomena, of course, suggests the presence of plastic memory. Where closures are concerned, however, it is useful to avoid using pop-open, memory closed terminology in all cases because the object may have a configuration which, upon momentary deformation, causes the nearby portion to spring to a very different disposition—one which upon release of the deformation will not allow it to return to its former disposition. For example, depression of a given such object may cause a certain portion of the object to spring free—say a lid previously restrained in tension with potential energy, as that concept is known to the study of physics. If popped open and allowed to play out its kinetic energy, operator (200) manipulation will be required to return it to its previous locale, an operation herein considered to exhibit pop-open, pop-shut capability. However, if like the Latin American coin purse, the potential energy is retained merely in a different disposition so that upon the operator's (200) release of the momentary deformation, the object returns directly to its previous disposition, that operation is herein considered to exhibit pop-open, memory closed capability. The difference between the two concepts becomes very important where it is desired that the object attain a state of rest during the intervening period so that no potential energy is retained to interfere with other necessary operations.

It seems every fishing enthusiast probably has a secret hole, secret method or secret device to achieve the greatest success in catching fish. While it may be that many of the enthusiasts perhaps might from an occasional sense of sportsmanship or fairness throw one or two of them back into the water, it is typical even in this recreational field of endeavor that he or she would not likely forego the fruits of secrecy by unprofitably contributing a gadget of their own creation to others. The history of the prior art, ante, is replete with protective containers for barbed fishing lures (101) and many of them even connect to a fishing rod (100). All of them were undoubtedly cloaked in the paranoia only an avid fisherman—or fisher-person—could possess; no less a treasure than that secret hole; each of the almost unbelievably numerous devices providing a little twist here, a new wrinkle there. All were dedicated to the same ends pursued herein. Time does not linger, however. This is an instance in which the bounty of one of the productive innovations of the past half-century or so—namely plastics—have made possible other welcome ones upon the old technology. The desired—if not required—properties are now commercially available in plastics provided in thin flexible sheets. It is difficult to conceive how anyone before that era might have designed or even foreseen a pop-open, pop-shut enclosure of the kind featured here.

There were, of course, early beginnings. In 1889, U.S. Pat. No. 402,270 issued to Mumford provided a container for fish-hooks (101) which connected to the fishing rod (100) with a buckled strap or alternatively, actual attachment with a screw. U.S. Pat. No. 911,117 issued to Crosier two decades later featured a spring clamp for axial connection of the container to the hand-held end of the rod (100) in what may properly be considered rigid attachment. Still later, U.S. Pat. No. 1,916,069 issued to Cammack comprised a container-to-rod (100) clamp connection secured by a wing nut.

The spring clamp in U.S. Pat. No. 2,285,888 issued to Benton was pivotally designed for snap shut retention around the rod (100) and as an innovative departure, admirably featured a longitudinally accessible opening. A pair of opposing clamps secured by bolt and nut were used in U.S. Pat. No. 2,584,430 issued to Dayton, et al.

U.S. Pat. No. 2,627,133 issued to Pletcher adopted a wire spring clamp for rod (100) connection but more interestingly broke new ground in providing a pop-open, memory closed plastic enclosure for the lure, the wire clamp aiding the memory function in urging clamshell shaped halves together. U.S. Pat. No. 2,699,623 issued to Pragalz employed welded bracket plates for the safeguarding container's connection to the rod (100). Then, in U.S. Pat. No. 2,767,502 issued to Reynolds, a striking longitudinally hinged container employing pop-open, pop-shut closure means forming a rod (100) passageway therethrough—effectually, the caddying tunnel (3) addressed herein, ante—was provided. The bare non-containered spring clamp bolted to the rod in U.S. Pat. No. 2,825,992 issued to Miller comprised a reversion to the past but may have been simpler to manipulate than its contemporaries. U.S. Pat. No. 2,885,817 issued to Carter featured only a fishing flotation device but illustrated a then relevant pivotal rod (100) clamp secured by a longitudinally disposed pin. The spring clamp featured in U.S. Pat. No. 3,484,980 issued to Wait was perhaps superior to the usual stock-in-trade in doubling back upon itself to strengthen rod (100) retention. U.S. Des. Pat. No. 217,663 issued to Chaberlain comprises ornamentation property in a rotational cover for access to the container spring clamped to the rod (100) in the usual manner.

U.S. Pat. No. 4,015,361 issued to O'Reilly artfully fashioned in the image of a fish a plastic snap-apart, snap-together container with what may have been the debut of longitudinal halves wisely connected to one another by a molded integral hinge, although the rod (100) connection merely comprised a small opening through which wire or string was reeved for simple tying or knotting. U.S. Pat. No. 4,216,604 issued to Starke also features a snap-apart, snap-together plastic container with integrally hinged longitudinal halves designed in this case, however, to enwrap not the mid-portion of the rod (100) but its (100) end. In U.S. Pat. No. 4,418,490 issued to Ancoma, the container is water-filled for the storage of minnows or other bait and folds around the rod (100) with miniature hook and loop connectors. Opening and closing the longitudinally split halves of the container in U.S. Pat. No. 4,452,003 issued to Deutsch, eta/was accomplished in snap-apalt, snap-together fashion. For connection to the rod (100), a plate with an accessible aperture—more or less on the order of the small closing tabs for plastic bags one finds at the supermarket—was molded to the container.

In U.S. Pat. No. 4,936,040 issued to Reiter, et al, the pop-open, memory closed feature presented by Pletcher, supra, reappeared. The featured device comprised only an external hook for connection to an eyelet on the rod (100). U.S. Pat. No. 5,233,783 issued to Roebuck, etal, like O'Reilly, supra, adopted the fish imagery for the container and like Reiter, employed the pop-open, memory closed and external hook rod (100) eyelet connector features. U.S. Pat. No. 5,297,676 issued to Coleman comprised an entire tackle box, the container of which was configured more or less in the manner of a fruit jar, merely employing buckled straps for rod (100) connection. U.S. Pat. No. 5,430,969 issued to Taylor, et al represents a specially shaped container spring clamped to the rod (100). U.S. Pat. No. 5,992,082 issued to Barefoot adopted the pop-open, memory closed characteristics of Pletcher, supra, together with the miniature hook and loop rod (100) connection of Ancoma, supra. Finally, U.S. Pat. No. 6,082,041 issued to Croop, eta/employed typical spring clamps for external connection to the rod (100) and like Coleman, fostered the fruit jar-like structure for the container.

By reason of the inherent character of the fishing pastime, let us hope the needs and objectives pointed out herein never become fully met. There will always undoubtedly be another fisherman's—or fisher-person's—secret lurking somewhere, waiting for prideful revelation. To address the constantly arising objectives, the inventor herein presents this secret of his own.

SUMMARY OF THE INVENTION

The invention is a shell connectable to a fishing rod (100) for stowage of a barbed fishing lure (101) to avert injury to the operator (200). It features pop-open, pop-shut capability and, preferably, is conveniently formed to pend loosely from the rod (100).

In the main, the shell comprises a semi-tubular body (1) and an enclamping lid (2), the two of which (1,2) are joined in hinged connection, preferably one of integral attachment formed by in manufacture by molding them (1,2) together along adjoining edges. The body (1) comprises first and second laterally opposing ridges (11, 12, respectively) and enclosed longitudinally opposing ends (13). Similarly, the enclamping lid (2) comprises first and second laterally opposing edges (21, 22, respectively) and longitudinally opposing ends—which, however, are not enclosed but open. The longitudinally extending portions of the body (1) and lid (2) which are hinged together comprise the body's second ridge (12) and the lid's second edge (22).

An enclamping lip (24) disposed upon the lid's second edge (22) preferably extends along the entirety of its (22) longitudinality. When the shell is closed, the lip (24) co-engages the body's second ridge (12) along an enclampment sector (14).

The semi-tubular body (1) comprises a pair of oppositely disposed encompassing notches (15)—one at each of its (1) longitudinally opposing ends (13). The sides of each notch (15) protrude upward to form notch shoulders (16).

Upon its topside, the enclamping lid (2) comprises a series of longitudinally disposed linear projections designated compression nodes (26, 27) herein. One of these—a pop-shut node (26,is disposed proximate the lid's second edge (22). To close the biased open shell and bring it into the disposition shown in FIG. 2, the operator (200) depresses downward upon this node (26), causing the lid's enclamping lip (24) to slide downward and slip past and co-engage the body's second ridge (12). Disposed more remotely from the lid's second edge (22) are one or more additional of the elongated protrusions, herein designated pop-open nodes (27). Downward operator (200) pressure upon either of them (27) causes the enclamping lip (24) to flex upward and outward to clear the body's second ridge (12) and, by reason of the lid's inherently biased open configuration, to spring upwards to dispose the shell as shown in FIG. 1. Depressing the nodes (26, 27) downward—particularly in pop-open operation—causes them to contact one or more of the notch shoulders (16), which thereby provide a fulcrum for lid (2) flexing. When the pop-shut node (26) is thus manipulated, most of the closure flexing occurs at the enclampment sector (14). Nonetheless, even this operation is facilitated by the fulcrum provided by the notch shoulders disposed more remotely therefrom (14)—those nearer the hinge.

To avoid closure interference possible from the notch shoulders (16) nearer the enclampment sector (14), the lid (2) is preferably shaped in the manner of a trapezoid, such that its second edge (22) is the shorter of the two thereof (21, 22).

The body's encompassing notches (15) permit convenient connection to a fishing rod (100) by allowing its (100) extension within the shell along and through a caddying tunnel (3). Preferably, the notches (15) are carved deeply enough to permit the shell to pend from the rod (100) and rotate loosely upon it (100).

BRIEF DESCRIPTION OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention.

FIG. 4 depicts an operator's (200)opening manipulation of a closed shell accomplished by his or her (200) downward depression of one of two pop-open nodes (27), thereby enabling the enclamping lid (2) to flex upward and outward to clear the body's second ridge (12) for disengagement from it (12), thereby allowing the lid (2) to occupy the sprung open position illustrated in FIG. 1, supra.

DESCRIPTION OF THE PREFERRED EMBODIMENT

Figure 1:
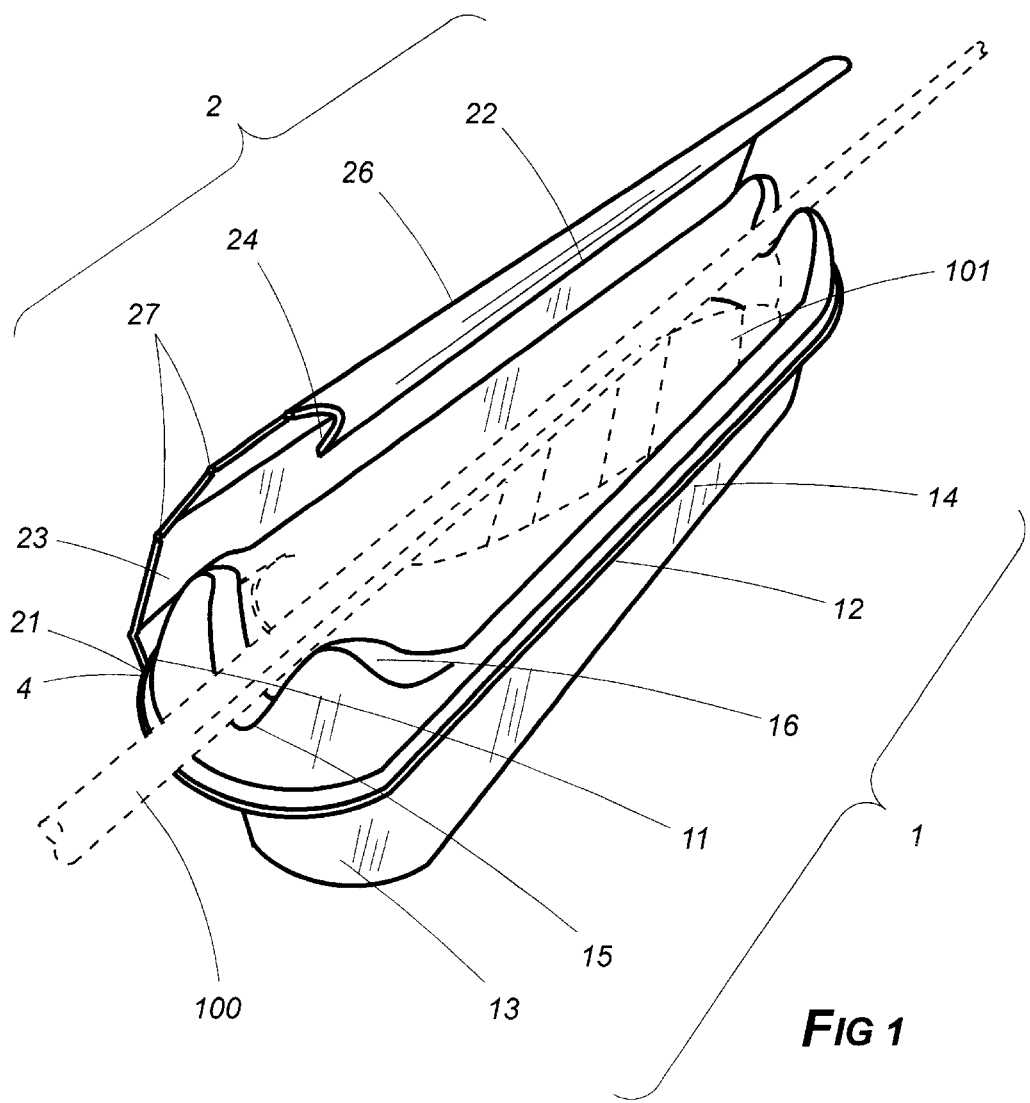
FIG. 1 represents the shell in perspective with the enclampment lid (2) opened upward from the semi-tubular body (1), its inherently spring biased disposition. A fishing rod is shown positioned for nesting within the caddying tunnel (3) and a barbed lure (101), reposing within the body's (1) interior. The enclamping lid's (2) trapezoidal configuration, ante, though present, it is not as,clearly discernable here as in the other drawings.
Figure 2:
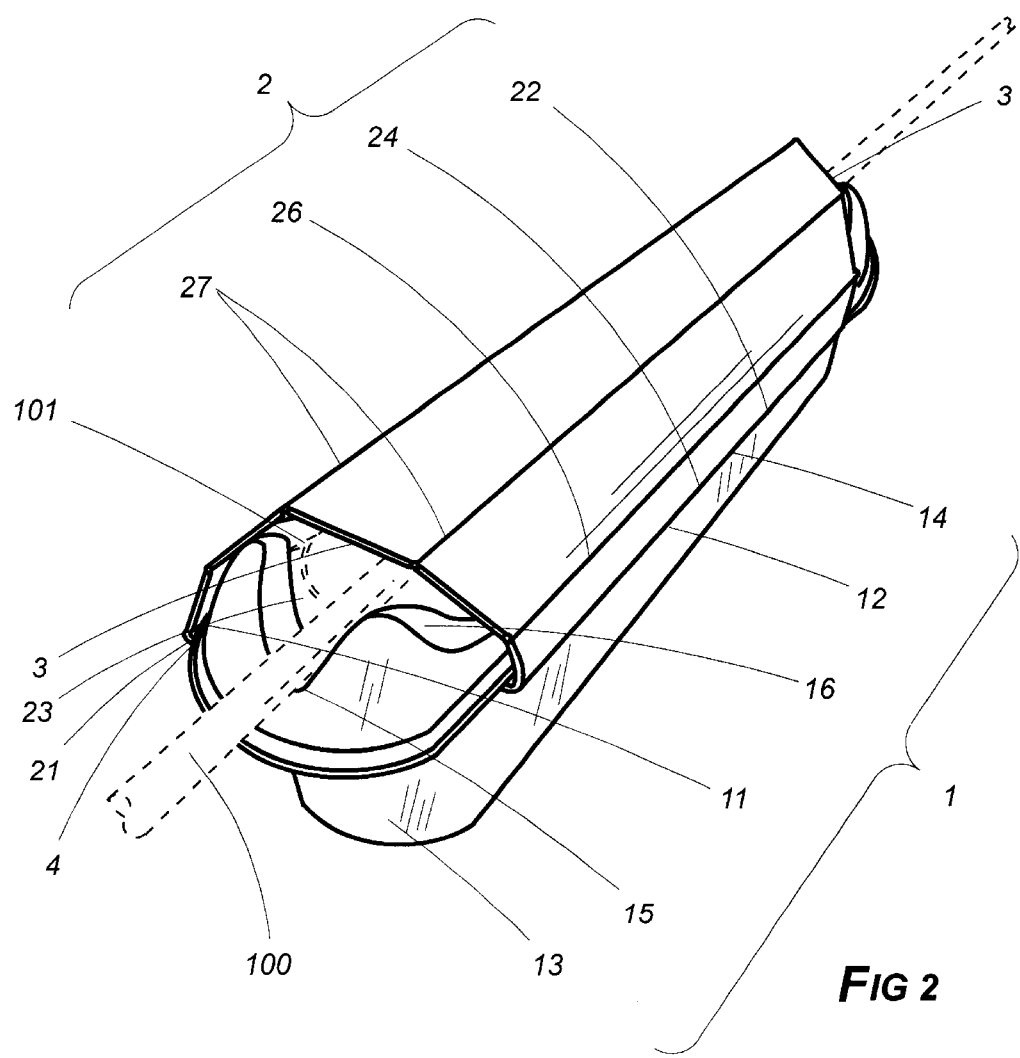
FIG. 2 comprises a perspective view of the shell in closed disposition with the enclamping lip (24) in co-engagement with the semi-tubular body's second ridge (12) at the enclampment sector (14).
Figure 3:
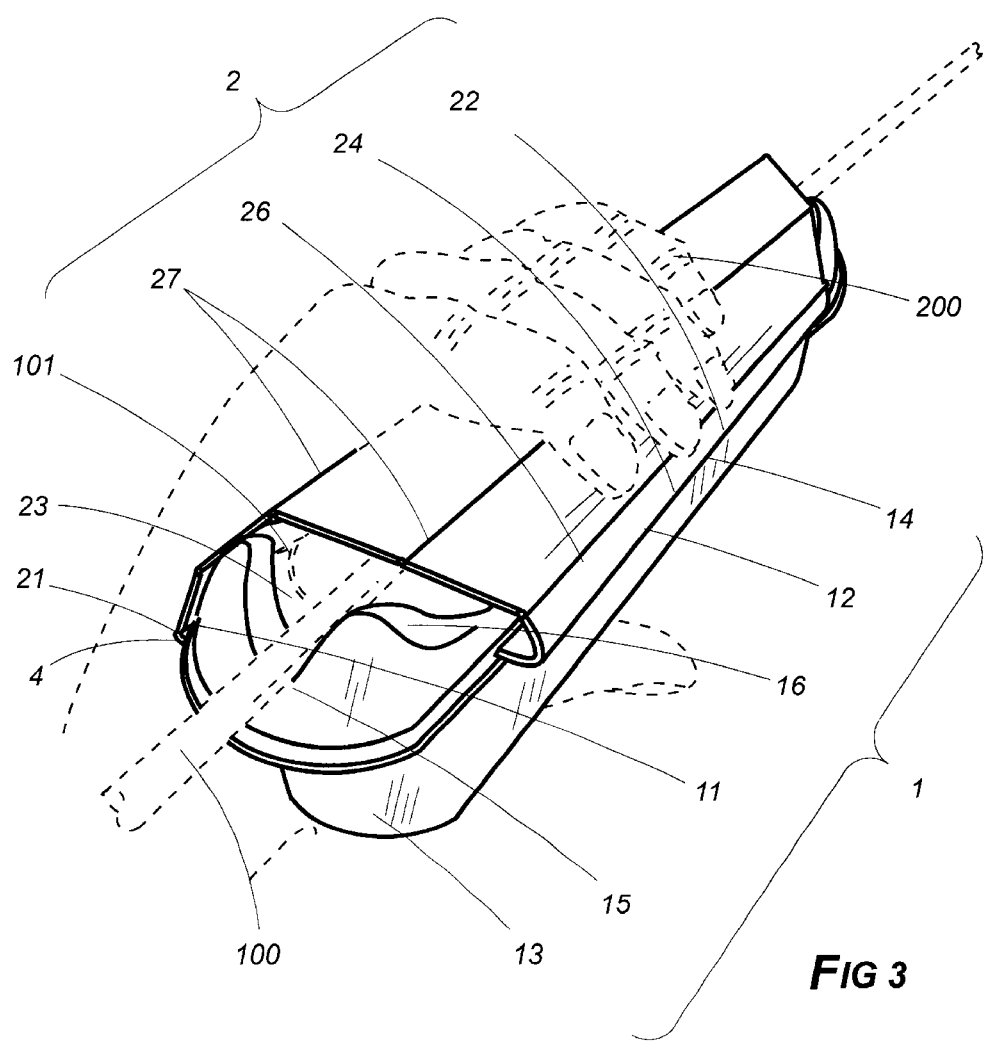
FIG. 3 illustrates an operator's (200) closing manipulation of an open shell accomplished by his or her (200) downward depression of the pop-shut node (26) thereby enabling the enclamping lid (2) to slip past the body's second ridge (12) for co-engagement with it (12) at the enclampment sector (14).

The subject of this application is a protective plastic shell, preferably transparent, which may be mounted upon a fishing: rod (100) and within which barbed lures or fishhooks (101) may be emplaced to avert injury to an operator or for stowage in general.

The shell comprises in part a semi-tubularly configured body (1), comprising enclosed longitudinally opposing ends (13) and, extending along its (1) longitudinal dimension, first and second laterally opposing edges (11, 12, respectively), the latter of which (12) comprises flanged configuration.

The shell further comprises an enclamping id (2), itself semi-tubularly configured in having a degree of longitudinal concavity, comprising open longitudinally opposing open ends (23) and first and second laterally opposing edges (21, 22, respectively). The first edge (21).is disposed by hinged connection to the body's first ridge (11). Preferably, an integrally hinged connection (4)—one of true attachment—comprises this connection, wherein the lid's first edge (21) and the body's first ridge (11) are molded together by extrusion or by infusion. For reasons mentioned ante, the lid may comprise trapezoidal configuration with the sides joining the first and second edges (21, 22, respectively) angled toward one another so that the second edge (22) is shorter than the first (21).

The enclamping lid (2) comprises an enclamping lip (24) disposed along its second laterally opposing edge (22), The lip's (24) configuration is such as to, co-engage the semi-tubular body's flanged second ridge (12) at what is herein identified as an enclampment sector (14) to form an enclosure. While the sector (14) may extends substantially along the entirety of the body's (1) longitudinal aspect.

The semi-tubular body (1) is configured to comprise an encompassing notch (15) disposed upon the upper portion of each of the body's ends (13). The notches (15) are, thus, oppositely disposed in the longitudinal sense and when the shell is closed by mutual enclampment of the lid (2) and semi-tubular body (1) along the enclampment sector (14), a longitudinally disposed caddying tunnel (3) is formed proximate the lid (2). The tunnel (3) provides a longitudinal opening through which a portion of a fishing rod (100) reposes when the shell is by such means (3) axially connected to it (100). Preferably, the notches (15) comprise size sufficient to permit the shell to rotate loosely upon the rod (100) so that when the latter (100) is held in its usual operable orientation, the shell pends—that is, hangs freely— to facilitate its use by the operator (200).

Co-engagement of the enclamping lip (24) and the body's flanged second laterally opposing ridge (12) would not, of course, be possible but for the shell's plastic, resilient composition and its configuration, supra. Closing and opening the shell is accomplished by the operator's (200) gently squeezing downward or inward at one point or another along the length of the lid (2) and is made possible by what is herein characterized as pop-open and pop-shut capability. To facilitate this operation, the semi-tubular body (1) additionally comprises notch shoulders (16)—sturdy peaked structures extending upwards a short distance along the sides of each encompassing notch (15)—and the enclamping lid (2), additionally comprises pop-shut and pop-open compression nodes (26, 27, respectively)—elongated protrusions longitudinally disposed along its (2) upward exterior or topside— the pop-shut compression node (26) proximate the lid's second edge and one or more pop-open compression nodes (27) otherwise so disposed but distal the lid's second edge (12). Experience demonstrates that the configuration for the enclamping lid (2) which confers the best operability upon the pop-open, pop-shut feature is the trapezoidal one mentioned supra. In certain models, the sides of a strictly rectangular lid (2) do not clear the notch shoulders (16) nearest the body's second ridge (12), preventing it (2) from responding with the flexibility desired upon the operator's (200) fingered depression of the compression nodes (26, 27). As the drawings illustrate, the inward slanting of the trapezoid's sides permit the lid (2) to flex in a manner facilitating the operator's (200) pop-open and pop-shut manipulations and without compromising the height of the shoulders (16) which as we have seen, themselves (16) contribute considerably to the operation.

By reason of these embellishments (16, 26), the operator (200) is able to flex an unengaged enclamping lip (24) inwards upon the body's second ridge (12) at the enclampment sector (14) and thereby impinge it (24) into co-engagement with the ridge (12) in pop-shut fashion merely by depressing or gently forcing the pop-shut compression node (26) downward. Indeed, the preferable disposition, configuration and composition of the two members (12, 24) is such that by reason of mutual interference between the enclamping lip (24) and the body's flanged second ridge (12), closure, though not impossible, occurs only with relative difficulty when attempted in any other manner such as, for example, by attempting to press the two (12, 22) together directly.

Conversely, the operator (200) is able to flex the enclamping lip (24) outward and upward, undoing its (22) co-engagement with the body's flanged second ridge (12) in pop-open fashion merely by depressing or gently forcing downward against the notch shoulders (16) any of the pop-open, more distally disposed, compression nodes (27). As a point of subtlety, it happens that opening the shell is not as restrictive in technique as closing it. As important as it is to make the pop-shut node (26) the precise situs of depression to attain closure, experience fairly well demonstrates that an operator (200) may snap the shell open, ignoring the presence or absence of pop-open nodes (27), by depressing any point within a substantial portion of the lid (2) remote its second edge (22). The lid's (2) concavity provides sufficient flexing tension for the purpose. It is, therefore, appropriate to consider the distal pop-open nodes (27) more as convenient markers or manipulation sites for pop-open operation.

Mutual tensions within the body (1) and the lid (2) comprising such disposition, configuration and composition, thus, permit the co-engaging parts (12, 24) to be snapped together or apart with a properly applied gentle squeeze. Moreover, by reason of the shell's pop-open, pop-shut feature—as distinguished, for instance, from one comprising pop-open, memory closed character, the shell may be conveniently mounted around a portion of the fishing rod (100) without having first to open it against the memory closed tension for the purpose.

What is claimed is:

1. A protective plastic shell for a barbed fishing lure comprising
    a semi-tubularly configured body comprising laterally opposing first and second ridges disposed to extend substantially along the entirety of its longitudinal aspect and enclosed longitudinally disposed ends;
    an enclamping lid comprising
        first and second laterally opposing edges, wherein the first edge is disposed by hinged connection to the semi-tubularly configured body's first ridge;
        open longitudinally disposed ends;
        an enclamping lip disposed upon and substantially along the entirety of the lid's second edge;

a pop-shut compression node longitudinally disposed upon the lid's exterior proximate its second edge; and one or more pop-open compression nodes otherwise so disposed but distal the lid's second edge; the semi-tubularly configured body further comprising an encompassing notch disposed at each end thereof, such that upon forming an enclosure by reason of mutual enclampment of the lid and semi-tubularly configured body along an enclampment sector, a caddying tunnel is longitudinally disposed proximate the lid wherein the protective shell may be axially connected to a fishing rod; and longitudinally opposing notch shoulders disposed upwards along the sides of each encompassing notch; the disposition, configuration and composition of the lid and semi-tubularly configured body being such that upon an operator's depression of the pop-shut node, the lid's second edge is flexed inward to co-engage the second ridge of the semi-tubularly configured body and upon the operator's depression of a pop-open node, is flexed outward to effect release thereof.

2. The protective plastic shell for a barbed fishing lure according to claim 1 wherein the disposition, configuration and composition of the lid and semi-tubularly configured body are such that by reason of mutual interference between the enclamping lip and the body's second ridge, closure, though not impossible, occurs only with relative difficulty when attempted in any manner other than depression of a compression node.

3. The protective plastic shell for a barbed fishing lure according to claim 1 wherein the hinged connection between the enclamping lid and the semi-tubularly configured body is one of integral attachment.

4. The protective plastic shell for a barbed fishing lure according to claim 1 wherein the enclamping lid comprises a trapezoidal configuration with the sides joining the first and second edges being angled toward one another so that the second edge is shorter than the first edge, thereby facilitating the operator's pop-open and pop-shut manipulations.

5. The protective plastic shell for a barbed fishing lure according to claim 1 wherein each notch comprises a size sufficient to permit the shell to rotate loosely along and pend from the rod.

6. The protective plastic shell for a barbed fishing lure according to claim 1 wherein the shell is transparent.

7. The protective plastic shell for a barbed fishing lure according to claim 1 wherein the number of pop-open compression nodes is two.

* * * * *